(12) United States Patent
Wirth et al.

(10) Patent No.: US 8,453,792 B2
(45) Date of Patent: Jun. 4, 2013

(54) EXHAUST SYSTEM AND CORRESPONDING SUPPORT STRUCTURE

(75) Inventors: Georg Wirth, Kirchheim/Teck (DE); Rolf Jebasinski, Filderstadt (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 13/104,151

(22) Filed: May 10, 2011

(65) Prior Publication Data

US 2011/0278090 A1   Nov. 17, 2011

(30) Foreign Application Priority Data

May 11, 2010 (DE) .......................... 10 2010 020 033

(51) Int. Cl.
*F01N 1/02* (2006.01)

(52) U.S. Cl.
USPC ......................................................... 181/250

(58) Field of Classification Search
USPC .................. 181/250, 266, 273, 276
See application file for complete search history.

(56) References Cited

U.S. PATENT DOCUMENTS

| | | | |
|---|---|---|---|
| 2,297,046 A * | 9/1942 | Bourne .......................... | 181/250 |
| 3,525,419 A | 8/1970 | Cassel | |
| 6,508,331 B1 * | 1/2003 | Stuart .......................... | 181/250 |
| 6,792,907 B1 | 9/2004 | Kostun et al. | |
| 7,017,707 B2 | 3/2006 | Zia et al. | |
| 7,240,769 B2 | 7/2007 | Nezan et al. | |
| 2005/0247516 A1 * | 11/2005 | Uegane .......................... | 181/228 |
| 2009/0014236 A1 | 1/2009 | Van De Flier et al. | |

FOREIGN PATENT DOCUMENTS

| | | |
|---|---|---|
| DE | 100 84 870 T1 | 4/2003 |
| DE | 103 33 021 A1 | 3/2004 |
| DE | 102004007717 A1 | 9/2004 |

* cited by examiner

*Primary Examiner* — Jeremy Luks
(74) *Attorney, Agent, or Firm* — McGlew and Tuttle, P.C.

(57) ABSTRACT

An exhaust system (3) of an internal combustion engine (2) is provided in a support structure (1), especially in a motor vehicle (1), with at least one exhaust pipe (8), which guides exhaust gas from the internal combustion engine (2) to the environment (4) of the support structure (1). At least one exhaust muffler (5) is provided which has at least one resonance volume (6) and at least one connection line (7), via which the respective resonance volume (6) is connected to the respective exhaust pipe (8) for transmitting airborne sound. A space-saving accommodation is obtained if at least one such resonance volume (6) is formed in a resonance chamber (9) arranged rigidly in or at the support structure (1) and if the respective connection line (7), with which the respective resonance chamber (9) is connected to the respective exhaust pipe (8), is designed as a flexible connection line and permits relative movements between the respective resonance chamber (9) and respective exhaust pipe (8).

19 Claims, 1 Drawing Sheet

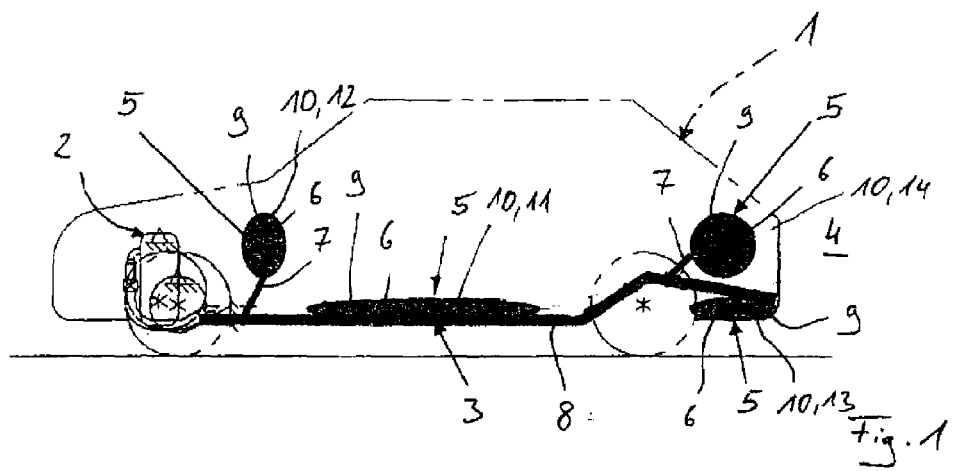
Fig. 1
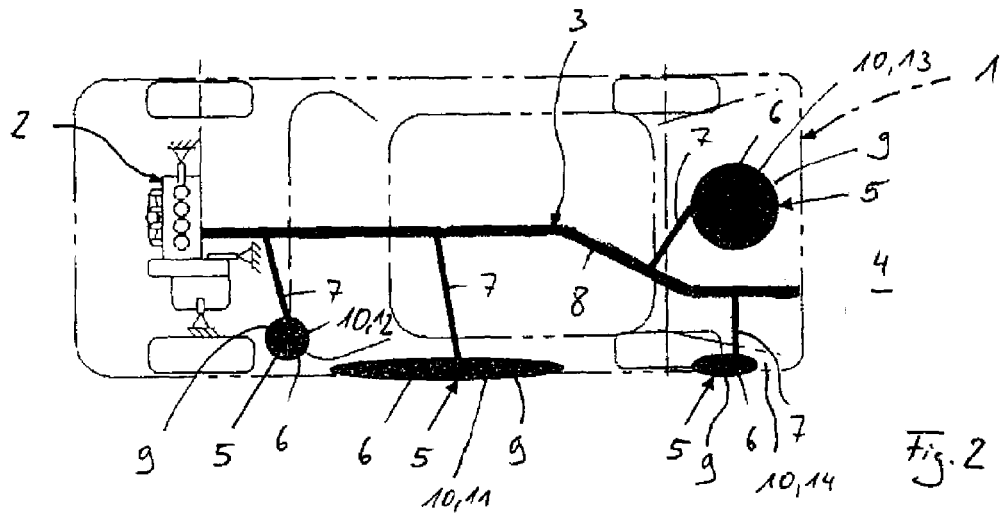
Fig. 2
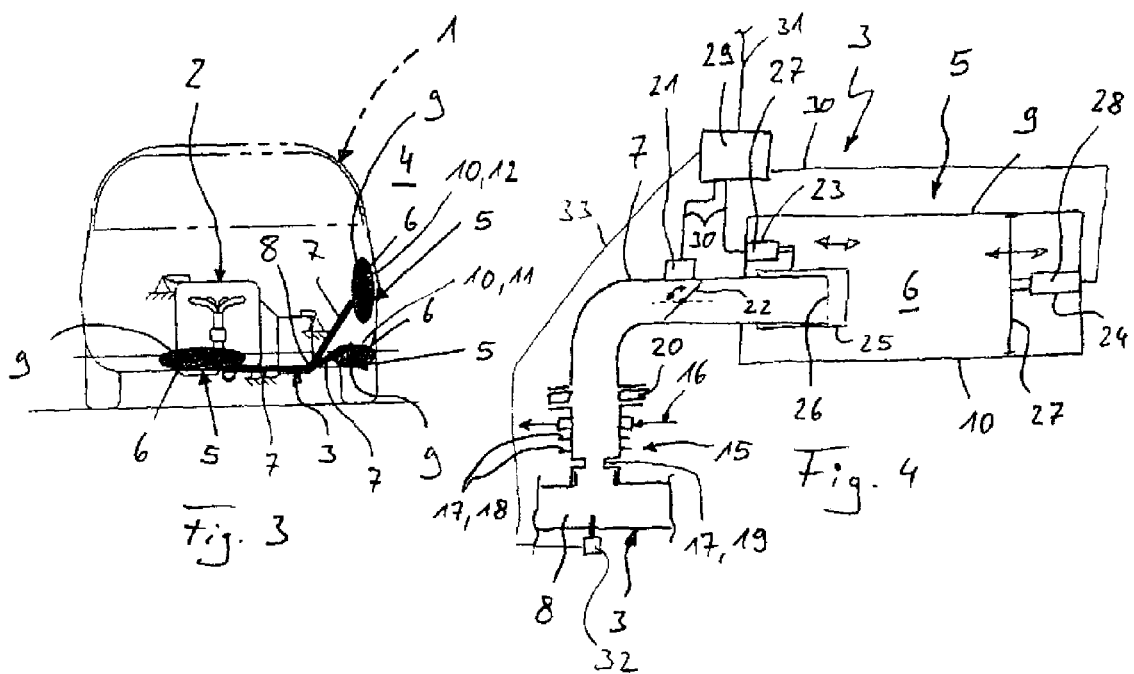
Fig. 3
Fig. 4

EXHAUST SYSTEM AND CORRESPONDING SUPPORT STRUCTURE

CROSS REFERENCE TO RELATED APPLICATIONS

This application claims the benefit of priority under 35 U.S.C. §119 of german Patent Application DE 10 2010 020 033.6 filed May 11, 2010, the entire contents of which are incorporated herein by reference.

FIELD OF THE INVENTION

The present invention pertains to an exhaust system of an internal combustion engine in a support structure, e.g., in a motor vehicle. The present invention pertains, besides, to a support structure, especially a motor vehicle, with an internal combustion engine and with such an exhaust system.

BACKGROUND OF THE INVENTION

An exhaust system usually comprises at least one exhaust pipe, which guides exhaust gas from the internal combustion engine to the environment of the respective support structure. To muffle sound emission, an exhaust system usually has at least one exhaust muffler, which may have at least one resonance volume and at least one connection line, via which the respective resonance volume is connected to the respective exhaust pipe for transmitting airborne sound.

In the usual mode of construction, the exhaust muffler comprises an exhaust muffler housing, in which said resonance volume is formed. The housing is then integrated into the exhaust pipe of the exhaust system via an inlet and an outlet. At least one such connection line is then connected in the interior of the exhaust muffler housing the resonance volume with the exhaust gas path leading from the inlet to the outlet.

It is problematic in this conventional mode of construction that comparatively large resonance volumes are frequently necessary, e.g., in order to muffle low-frequency interfering sound. The exhaust muffler housings are correspondingly comparatively large and have a correspondingly large mass. In addition, the accommodation of such large-volume exhaust mufflers at the respective support structure is problematic, especially if it is a motor vehicle.

SUMMARY OF THE INVENTION

The object of the present invention is to provide an improved embodiment for an exhaust system or for a support structure equipped therewith, which embodiment is characterized especially in that the exhaust system has a comparatively light weight and/or requires a comparatively small space for its installation.

According to the invention, an exhaust system of an internal combustion engine in a motor vehicle support structure is provided. The exhaust system comprises an exhaust pipe which carries exhaust gas from the internal combustion engine to the environment of the support structure and an exhaust muffler. The exhaust muffler has a resonance volume and a connection line connecting the resonance volume to the exhaust pipe for transmitting airborne sound. The resonance volume is formed in a resonance chamber arranged rigidly in or at the support structure. The connection line comprises a flexible line permitting relative movement between the resonance chamber and the exhaust pipe.

The present invention is based on the general idea of forming at least one such resonance volume not in an exhaust muffler housing, but in a resonance chamber, which is arranged rigidly in or at the support structure. The respective connection line is then designed as a flexible connection line such that it permits relative movements between the resonance chamber and the exhaust pipe. In other words, the resonance chamber containing the resonance volume is structurally uncoupled from the otherwise conventional exhaust system and is arranged or formed, instead, at or in the support structure. On the one hand, the weight of the exhaust system decreases as a result, because, e.g., a heavy exhaust muffler housing, which is integrated in the exhaust pipe, can be done away with. On the other hand, a large-volume exhaust muffler housing is eliminated, so that the exhaust pipe and ultimately the exhaust system require less space for their installation. Another special advantage of the suggestion according to the present invention is seen in that cavities that are present in the support structure and especially in the motor vehicle anyway can be utilized to form or accommodate the resonance chamber. The flexible connection line brings about at the same time an uncoupling of vibrations between the resonance chamber and exhaust pipe. The respective resonance chamber can thus move with the support structure, while the exhaust pipe can move relative to the support structure, especially because of vibrations. In addition, especially advantageous is the circumstance that the suspension of the exhaust pipe on the support structure is considerably simplified, because the large weight of an exhaust muffler housing containing the resonance volume can be eliminated.

Corresponding to an advantageous embodiment, at least one resonance chamber may be formed by a hollow body of the support structure or formed in such a hollow body, i.e., it may be arranged therein as a separate or additional component. In other words, a hollow body present in the support structure anyway is used here to embody the resonance chamber. Usable hollow bodies occur in a support structure, for example, in hollow supports or in other unused intermediate spaces.

For the preferred case in which the support structure is a motor vehicle, said hollow body may be formed by a rocker panel or by a pillar or by a carrier or by a fender cavity or by a spare tire tub or the like. Hitherto unused cavities or hollow bodies of the vehicle can thus be utilized to accommodate or realize the respective resonance chamber of the exhaust system.

According to another advantageous embodiment, the respective resonance chamber may be made of plastic. In addition or as an alternative, the respective connection line may be designed as a flexible tube, namely, preferably likewise made of plastic. The present invention utilizes here the discovery that the hot exhaust gas does not flow through a resonance chamber, especially in case of a Helmholtz resonator, but said resonance chamber is coupled with the exhaust pipe only in terms of the airborne sound transmission. Since only airborne sound is transmitted, there is only a markedly reduced thermal load in the resonance volume. It is correspondingly possible in the uncoupled mode of construction being presented here to manufacture the resonance chamber and/or connection line from plastic. Metallic materials are usually used because of the high temperatures of the exhaust pipe in an exhaust muffler housing that is integrated in the exhaust system. The plastic construction reduces manufacturing costs and weight.

In another embodiment, each resonance chamber may be designed with the respective, at least one connection line specifically for muffling a certain frequency band. However, a plurality of resonance chambers are preferably provided, which are designed with the respective, at least one connection line specifically for muffling a plurality of different frequency bands, and said frequency bands mutually overlap corresponding to an advantageous embodiment. Broad-band muffling within the exhaust system can be achieved hereby for airborne sound.

If the connection line is made of plastic, it may be connected to the respective exhaust pipe via a thermally uncoupling connection element corresponding to a preferred embodiment. Such a thermally uncoupling connection element may have, for example, a constructive narrow space and/or a thermal insulator to reduce the heat transfer from the exhaust pipe to the connection line. In addition, it is possible to cool the connection element and/or to equip it with a cooling structure. A suitable cooling structure is, for example, the aforementioned narrow space or at least a cooling fin.

According to an especially advantageous embodiment, at least one such connection line may be designed to hold the exhaust pipe at the support structure. In other words, the respective connection line assumes a holding or carrying function here in order to fasten the exhaust pipe to the support structure. Due to the elasticity or flexibility of the respective connection line, uncoupling of vibrations between the exhaust pipe and support structure can be achieved at the same time as well. Especially advantageous is an embodiment in which the exhaust pipe is held at the support structure exclusively via a plurality of such connection lines. This means that the exhaust pipe is fastened to the support structure via such connection lines only aside from its fastening to the internal combustion engine. The exhaust pipe is uncoupled from the support structure in terms of vibrations due to the flexibility of the connection lines, as a result of which especially the transmission of structure-borne noise from the exhaust pipe to the support structure is significantly reduced as well.

Corresponding to another embodiment, at least one switching element may be provided for activating and deactivating the sound-transmitting connection between the respective exhaust pipe and the respective resonance volume. Since the respective resonance chamber is thermally extensively uncoupled from the rest of the exhaust system, especially inexpensive switching elements may be used to make it possible to activate and deactivate the respective resonance volume. On the whole, a switchable sound muffling can thus be achieved, which connects or disconnects the resonance volume depending on certain operating states of the internal combustion engine.

In addition or as an alternative, at least one adjusting means may be provided for varying the resonance volume of the respective resonance chamber and/or the length of the respective connection line. This embodiment is also based on the consideration that the resonance chamber is thermally extensively uncoupled from the exhaust pipe, so that inexpensive adjusting means can be used here to make it possible to embody a variable resonance volume or a variable connection line. By varying the resonance volume or length of the connection line, the resonance frequency of the respective exhaust muffler can be varied significantly. It is possible as a result, in particular, to adapt or adjust the respective exhaust muffler to different operating states of the internal combustion engine.

For example, a load-dependent and/or rpm-dependent actuation of the respective switching element or of the respective adjusting means can be embodied.

It is apparent that the above-mentioned features, which will also be explained below, can be used not only in the particular combination indicated, but in other combinations or alone as well without going beyond the scope of the present invention.

Preferred embodiments of the present invention are shown in the drawings and will be explained in more detail in the following description, using identical reference numbers to designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a highly simplified schematic side view of a support structure designed as a motor vehicle with an exhaust system;

FIG. 2 is a top view of the vehicle from FIG. 1;

FIG. 3 is a front view of the vehicle from FIG. 1; and

FIG. 4 is a highly simplified schematic view of an exhaust muffler of the exhaust system.

DESCRIPTION OF THE PREFERRED EMBODIMENTS

Referring to the drawings in particular, corresponding to FIGS. 1 through 3, a support structure 1 comprises an internal combustion engine 2 and an exhaust system 3 for removing exhaust gas of the internal combustion engine 2 into an environment 4 of the support structure 1. In the example being shown, the support structure 1 is a motor vehicle, which can hereinafter be likewise designated by 1. As an alternative, support structure 1 may also be a stationary frame or the like in order to carry, e.g., a stationary internal combustion engine 2 with an exhaust system 3.

Exhaust system 3 comprises at least one exhaust muffler 5. Four such exhaust mufflers 5, which can be embodied cumulatively or alternatively or in any combination, are shown in the example in a purely exemplary manner and without limiting the general scope.

The respective exhaust muffler 5 has at least one resonance volume 6 and comprises at least one connection line 7. The respective connection line 7 connects the respective resonance volume 6 to an exhaust pipe 8 of the exhaust system 3. While the exhaust pipe 8 carries the exhaust gases from the internal combustion engine 2 to the environment 4, the respective connection line 7 is used only to transmit airborne sound between the exhaust pipe 8 and the respective resonance volume 6. In other words, the hot exhaust gas of the exhaust system 3 does not flow through the respective connection line 7.

Only a single resonance volume 6, which is coupled with the exhaust pipe 8 via a single connection line 7 only, is provided at each exhaust muffler 5 in the example being shown. As a result, the respective exhaust muffler 5 forms a Helmholtz resonator, which is designed with respect to its muffling action for a comparatively narrow frequency band only. The muffling action of the respective exhaust muffler 5 can be made into a more broad-band action by means of a plurality of resonance volumes 6 per exhaust muffler 5 and/or by means of a plurality of connection lines 7 per resonance volume 6. It is especially advantageous now to design the plurality of exhaust mufflers 5 for muffling different frequency bands, and this design may be obtained in a specific manner such that the individual frequency bands mutually overlap. On the whole, a comparatively great broad-band action can be obtained hereby for muffling the airborne sound transported in the exhaust pipe 8.

The resonance volume 6 can be connected to the exhaust pipe 8 for transmitting airborne sound by the respective connection line 7 being connected to the respective resonance chamber 9, on the one hand, and to the exhaust pipe 8, on the other hand.

The respective resonance volume 6 is now formed in a resonance chamber 9, which is arranged rigidly in or at the support structure 1. The resonance chamber 9 thus (also) forms a part of the support structure 1. The exhaust system 3 is thus integrated at least partly in the support structure 1. The respective connection line 7 is made flexible, such that it permits relative movements between the respective resonance chamber 9 and the exhaust pipe 8. Vibrations and other relative movements in relation to the vehicle 1 may occur within the exhaust system 3 during the operation of the internal combustion engine 2, especially in a motor vehicle 1. To make this possible in the area of the respective exhaust muffler 5 as well, the resonance chamber 9 arranged stationarily at the vehicle 1 is uncoupled from the exhaust pipe 8 in terms of vibrations or movements via the flexible connection line 7. This has, besides, the advantage that the mass of the resonance chamber 9 does not have to be supported at the vehicle 1 via the exhaust pipe 8 but is likewise uncoupled from the exhaust pipe 8. As a result, the suspension of the exhaust pipe 8 on the support structure 1 becomes simpler. To embody the desired flexibility of the connection line 7, the latter may also be designed, for example, as a flexible tube.

The respective resonance chamber 9 is preferably formed by a hollow body 10 of the support structure 1, i.e., the hollow body 10 is itself the resonance chamber 9 enclosing the resonance volume 6. As an alternative, the respective resonance chamber 9 may be formed in such a hollow body 10. The resonance chamber 9 is a component that is a separate or additional component concerning the hollow body 10 in this case, which is inserted or installed in the hollow body 10.

If the support structure 1 is a motor vehicle 1, like here, the respective hollow body 10 may be, for example, a rocker panel 11 in the area of a side door of the vehicle 1. The hollow body 10 may also be a pillar 12, for example, an A pillar, or a spare tire tub 13. As an alternative, the hollow body 10 may also be a fender cavity 14 or a side rail or a crossrail or another carrier of the body or of the shell of the vehicle 1.

As is shown, the respective connection line 7 is fastened either directly to the support structure 1 if the respective resonance chamber 9 is formed by a hollow body 10 of the support structure 1, or only indirectly, namely, via the resonance chamber 9, if this forms a separate or additional component concerning the hollow body 10 formed in the support structure 1, which said component is inserted into or installed in said hollow body 10 and is fastened to the support structure 1. Furthermore, the respective connection line 7 is fastened to the exhaust pipe 8 or is rigidly connected to the exhaust pipe 8, in which case a connection element 15 can be used for this, which will be explained in more detail elsewhere in reference to FIG. 4. At any rate, at least one such connection line 7 may be designed such that it assumes a carrying function or holding function for the exhaust pipe 8 in order to hold the exhaust pipe 8 at the support structure 1. It is especially advantageous if all connection lines 7 are designed such that they can assume this holding function for the exhaust pipe 8. In particular, it is also possible now to fix the exhaust pipe 8 to the support structure 1 exclusively via these connection lines 7, so that other fastening means for fastening the exhaust pipe 8 to the support structure 1 can be eliminated. The inlet-side connection of the exhaust pipe 8 to the internal combustion engine 2 does not represent a fastening of the exhaust pipe 8 to the support structure 1, but a fastening of the exhaust pipe 8 to the internal combustion engine 2.

Due to the flexibility of the respective connection line 7, a suspension that is uncoupled in respect to vibrations as well as in respect to the transmission of structure-borne noise is obtained between the exhaust pipe 8 and support structure 1, which significantly reduces, for example, an interfering noise transmission to the support structure 1.

The respective resonance chamber 9 may be advantageously made of plastic. This is possible due to the mode of construction being proposed, namely, due to the separation in space of the resonance chamber 9 from the exhaust pipe 8, because the hot exhaust gases do not flow through the resonance volume 6. In particular, the connection line 7 may also be made of plastic. The connection line 7 is preferably a flexible plastic tube.

According to FIG. 4, the respective connection line 7 may be connected to the exhaust pipe 8 via a connection element 15. This connection element 15 is thermally uncoupled or generates a thermal uncoupling between the exhaust pipe 8 and connection line 7. Heat transfer from the exhaust pipe 8 to the connection line 7 is thus significantly reduced. For example, the connection element 15 may be cooled. It may be connected, for example, to a cooling circuit 16 for this purpose. In addition or as an alternative, the connection element 15 may have at least one cooling structure 17, for example, cooling fins 18 and/or a cross-section contraction 19. In addition, the connection element 15 may be connected to the connection line 7 via a thermal insulation 20. This insulation 20 forms a thermally insulating section of the connection element 15. The above-mentioned measures for thermally uncoupling the connection element 15 may be embodied cumulatively or alternatively or in any desired combination.

According to FIG. 4, the respective exhaust muffler 5 may be equipped with at least one switching element 21, by means of which the sound-transmitting connection between the exhaust pipe 8 and the resonance volume 6 can be controlled, namely, especially activated and deactivated. For example, the switching element 21 may have for this purpose a switching member 22, which is designed as a butterfly valve in the example and with which the cross section of the connection line 7 through which flow is possible can be opened and blocked. A blocked position of the switching member 22 is indicated by a solid line, whereas an open position is shown with broken line.

In addition or as an alternative, the respective exhaust muffler 5 may be equipped with at least one adjusting means 23, 24. Two adjusting means, namely, a first adjusting means 23 and a second adjusting means 24, which may be embodied alternatively or cumulatively, are shown for illustration in the example. The first adjusting means 23 is used to vary the length of the connection line 7. For example, the first adjusting means 23 comprises for this an extension sleeve 25, which can be adjusted coaxially with an end section the connection line 7 [sic-Tr.Ed.] by means of an actuator 27. The length of the connection line 7 can hereby be varied. The second adjusting means 24 is used here to vary the resonance volume 6. For example, the second adjusting means 24 may have for this a partition 27, which is arranged in the resonance chamber 9, is adjustable therein and can be adjusted by means of an actuator 28. By adjusting the partition 27, the volume of the resonance chamber 9 and hence the resonance volume 6 can be varied. The adjusting movements of the switching element 22, sleeve 25 and partition 27 are indicated by double arrows in FIG. 4.

According to FIG. 4, it is also possible to provide a control means 29, which may be connected in a suitable manner to the switching element 21 and/or to the respective adjusting means 23, 24, for example, by means of control lines 30. In particular, the control means 29 may be coupled via at least one signal line 31 with an engine control device, not shown, of the internal combustion engine 2. The control means 29 is preferably programmed or designed such that it actuates the respective switching element 21 or respective adjusting means 23, 24 as a function of the load and/or rpm of the internal combustion engine 2 and/or as a function of the current exhaust gas temperature. For example, the control means 29 can thus activate and deactivate the respective resonance volume 6 and vary the respective resonance volume 6 and/or length of the respective connection line 7 as a function of the load and/or rpm and/or exhaust gas temperature. To detect the current exhaust gas temperature, the control means 29 may be coupled, in particular, with at least one suitable or suitably positioned temperature sensor 32 via a respective signal line 33. In addition or as an alternative, the control means 29 may also obtain the exhaust gas temperature from the engine control device if another temperature sensor is already present for another purpose anyway.

While specific embodiments of the invention have been shown and described in detail to illustrate the application of the principles of the invention, it will be understood that the invention may be embodied otherwise without departing from such principles.

What is claimed is:

1. An exhaust system of an internal combustion engine in a motor vehicle support structure, the system comprising:
    an exhaust pipe which carries exhaust gas from the internal combustion engine to the environment of the support structure;
    an exhaust muffler with a resonance volume and a connection line connecting the resonance volume to the exhaust pipe for transmitting airborne sound, the resonance volume being formed in a resonance chamber arranged rigidly in or at the support structure, the connection line comprising a flexible line permitting relative movement between the resonance chamber and the exhaust pipe; and
    a connection element comprising a cooling structure, said exhaust muffler being connected to said exhaust pipe via said connection element, said cooling structure cooling at least a portion of said connection element, wherein heat transfer from said exhaust pipe to said connection line is reduced via said cooling structure, wherein the resonance chamber is formed by a hollow body of the support structure.

2. An exhaust system in accordance with claim 1, wherein:
    the support structure is a motor vehicle; and
    the hollow body is a rocker panel or a pillar or a spare tire tub or a fender cavity or a carrier.

3. An exhaust system in accordance with claim 1, wherein at least one of:
    the resonance chamber is made of plastic; and
    the connection line comprises a flexible tube.

4. An exhaust system in accordance with claim 1, wherein a plurality of resonance chambers are provided with at least one connection line each for muffling a plurality of mutually overlapping frequency bands.

5. An exhaust system in accordance with claim 1, wherein the connection line is made of plastic and is connected to the exhaust pipe via a thermally uncoupled connection element.

6. An exhaust system in accordance with claim 5, wherein the cooling structure comprises a thermally insulating section of said connection element, a cooling circuit connected to said connection element, cooling fins connected to said connection part and a contraction portion of said connection element, said cooling circuit passing cooling fluid about at least a portion of said connection element, said cooling fins extending in a radially outward direction from said connection element with respect to a longitudinal axis of said connection element, said contraction portion having a diameter that is less than a diameter of another portion of said connection element.

7. An exhaust system in accordance with claim 4, wherein each connection line holds the exhaust pipe at the support structure.

8. An exhaust system in accordance with claim 1, further comprising a switching element for activating and deactivating a sound-transmitting connection between the exhaust pipe and the resonance volume, said sound-transmitting connection comprising a switching member, said switching member being arranged in said connection line between said connection element and said exhaust muffler, said switching member being mounted for movement such that said switching member is movable between a blocking position and an open position, said switching element controlling a position of said switching member.

9. An exhaust system in accordance with claim 1, further comprising:
    an extension sleeve arranged in said resonance volume, said extension sleeve being connected to an end section of said connection line;
    an adjusting means for varying the resonance volume of the resonance chamber; and
    another adjusting means for varying a length of the connection line, wherein said extension sleeve is movable relative to said end section of said connection line via said another adjusting means such that said extension sleeve is adjusted coaxially with said end section of said connection line, said connection element being adjacent to said exhaust pipe and another end section of said connection line.

10. An exhaust system in accordance with claim 8, further comprising a control means for at least one of:
    activating and deactivating the resonance volume as a function of one or more of load of the internal combustion engine, rpm of the internal combustion engine, exhaust gas temperature; and
    varying the resonance volume of the resonance chamber and the length of the connection line.

11. An exhaust system in accordance with claim 4, wherein each respective connection line is made of plastic and is connected to the respective exhaust pipe via a thermally uncoupled connection element.

12. A motor vehicle comprising:
    a support structure;
    an internal combustion engine connected to the support structure; and
    an exhaust system comprising:
        an exhaust pipe carrying exhaust gas from said internal combustion engine to the environment of said support structure;
        a connection part comprising a heat exchanger;
        an exhaust muffler comprising resonance chamber arranged rigidly in or at the support structure the resonance chamber having a resonance volume and a connection line connecting the resonance volume to the exhaust pipe proving a sound-transmitting connection for transmitting airborne sound from the exhaust pipe to the resonance volume, the connection line comprising a flexible line permitting relative movement between the resonance chamber and the exhaust pipe, said exhaust muffler being connected to said exhaust pipe via said connection part, said heat exchanger transferring heat from said exhaust pipe to an external environment of said exhaust pipe to cool at least a portion of said connection part, wherein heat transfer from said exhaust pipe to said connection line is blocked via said heat exchanger.

13. An exhaust system in accordance with claim 12, wherein the resonance chamber is formed by a hollow body of the support structure, said hollow body being a rocker panel or a pillar or a spare tire tub or a fender cavity or a carrier.

14. A motor vehicle in accordance with claim 12, wherein the exhaust muffler comprises another resonance chamber and another connection line to provide a plurality of resonance chambers each with at least one connection line, the plurality of resonance chambers muffling a plurality of mutually overlapping frequency bands.

15. A motor vehicle in accordance with claim 14, wherein each respective connection line is made of plastic and is connected to the respective exhaust pipe via said connection element, said heat exchanger comprising a thermally insulating section of said connection element, a cooling circuit connected to said connection element, cooling fins connected to said connection part and a contraction portion of said connection element, said cooling circuit passing cooling fluid about at least a portion of said connection element, said cooling fins extending in a radially outward direction from said connection element with respect to a longitudinal axis of said connection element, said contraction portion having a diameter that is less than a diameter of another portion of said connection element.

16. A motor vehicle in accordance with claim 12, further comprising a switching element for activating and deactivating the sound-transmitting connection between the exhaust pipe and the resonance volume, said sound-transmitting connection comprising a switching member, said switching member being arranged in said connection line between said connection element and said exhaust muffler, said switching member being mounted for movement such that said switching member is movable between a blocking position and an open position, said switching element controlling a position of said switching member.

17. A motor vehicle in accordance with claim 16, further comprising:
an extension sleeve arranged in said resonance volume, said extension sleeve being connected to an end section of said connection line;
an adjusting means for varying the resonance volume of the resonance chamber;
another adjusting means for varying a length of the connection line, wherein said extension sleeve is movable relative to said end section of said connection line via said another adjusting means such that said extension sleeve is adjusted coaxially with said end section of said connection line, said connection element being adjacent to said exhaust pipe and another end section of said connection line.

18. A motor vehicle in accordance with claim 17, further comprising a control means for at least one of:
activating and deactivating the resonance volume as a function of one or more of load of the internal combustion engine, rpm of the internal combustion engine, exhaust gas temperature via the switching element; and
varying at the resonance volume of the resonance chamber via said adjusting means and varying the length of the connection line via the another adjusting means.

19. An exhaust system of an internal combustion engine in a motor vehicle support structure, the system comprising:
an exhaust pipe which carries exhaust gas from the internal combustion engine to the environment of the support structure;
an exhaust muffler with a resonance volume and a connection line connecting the resonance volume to the exhaust pipe for transmitting airborne sound, the resonance volume being formed in a resonance chamber arranged rigidly in or at the support structure, the connection line comprising a flexible line permitting relative movement between the resonance chamber and the exhaust pipe;
an extension sleeve arranged in said resonance volume, said extension sleeve being connected to an end section of said connection line;
an adjusting means for varying the resonance volume of the resonance chamber and;
another adjusting means for varying a length of the connection line, wherein said extension sleeve is movable relative to said end section of said connection line via said another adjusting means such that said extension sleeve is adjusted coaxially with said end section of said connection line, said connection element being adjacent to said exhaust pipe and another end section of said connection line.

* * * * *